United States Patent [19]

Ohmura et al.

[11] Patent Number: 4,698,388

[45] Date of Patent: Oct. 6, 1987

[54] METHOD FOR MODIFYING THE SURFACE OR POLYMER MATERIALS

[75] Inventors: Hiroshi Ohmura; Yoshihiro Oshibe, both of Chita; Masaharu Nakayama, Nagoya; Takashi Yamamoto, Yokohama, all of Japan

[73] Assignee: Nippon Oil & Fats Co., Japan

[21] Appl. No.: 829,934

[22] Filed: Feb. 18, 1986

Related U.S. Application Data

[62] Division of Ser. No. 601,577, Apr. 18, 1984, Pat. No. 4,604,425.

[30] Foreign Application Priority Data

Apr. 30, 1983 [JP] Japan .................................. 58-74959

[51] Int. Cl.$^4$ ........................ C08L 9/00; C08L 31/00; C08L 53/00

[52] U.S. Cl. .................................. 525/88; 525/54.44; 525/89; 525/90; 525/91; 525/93; 525/92; 525/94; 525/95; 525/96; 525/98; 525/99; 525/273; 8/115.6; 428/420

[58] Field of Search ............... 525/95, 54.44; 428/420; 8/115.6

[56] References Cited

U.S. PATENT DOCUMENTS

| | | | |
|---|---|---|---|
| 3,068,187 | 12/1962 | Bolstad et al. | 524/533 |
| 3,574,791 | 4/1971 | Sherman et al. | 525/276 |
| 3,706,818 | 12/1972 | Mageli et al. | 525/273 |
| 3,792,005 | 2/1974 | Harlan | 525/99 |
| 3,846,396 | 11/1974 | D'Angelo et al. | 525/387 |
| 3,860,674 | 1/1975 | Sheppard et al. | 525/273 |
| 3,917,745 | 11/1975 | D'Angelo et al. | 525/273 |
| 3,991,109 | 11/1976 | D'Angelo et al. | 525/273 |
| 4,075,286 | 2/1978 | Macleay et al. | 525/267 |
| 4,175,101 | 11/1979 | Benton et al. | 525/89 |
| 4,315,997 | 2/1982 | Ujikawa et al. | 525/273 |
| 4,429,076 | 1/1984 | Saito et al. | 525/94 |
| 4,472,557 | 9/1984 | Kawashima et al. | 525/276 |

FOREIGN PATENT DOCUMENTS

| | | |
|---|---|---|
| 2054298 | 4/1971 | France . |
| 2472584 | 12/1980 | France . |
| 904262 | 8/1960 | United Kingdom . |
| 2026503 | 2/1980 | United Kingdom . |

OTHER PUBLICATIONS

Patents Abstract of Japan, vol. 7, No. 22—1/28/-83—98C148.

1297 Makromolekulare Chemie, vol. 183 (1982), Jul., No. 7, Heidelberg, Germany, pp. 1685–1700.

*Primary Examiner*—John Kight
*Assistant Examiner*—Dennis R. Daley
*Attorney, Agent, or Firm*—Parkhurst & Oliff

[57] ABSTRACT

The surface of a polymer material is modified by adding to the material a block copolymer. The block copolymer has a hydrophilic polymer portion and a polymer portion which is compatible with the polymer material to be modified. The block copolymer can be easily synthesized in the presence of a polymeric peroxide and can easily and permanently modify the surface of the polymer material.

3 Claims, No Drawings

METHOD FOR MODIFYING THE SURFACE OR POLYMER MATERIALS

This is a division of application Ser. No. 601,577, filed Apr. 18, 1984, now U.S. Pat. No. 4,604,425.

BACKGROUND OF THE INVENTION

1. Field of the Invention

The present invention relates to a method for modifying the surface of polymer materials by giving a hydrophilic property to the surface.

2. Description of the Prior Art

Conventional polymer materials have surfaces having poor hydrophilic properties and high electric resistance, and therefore they are easily charged in high voltage or are dirty by a slight mechanical action, for example, friction. Accordingly, their use field is very restricted. To obviate these drawbacks, it has been proposed to apply a surfactant to the surface of a polymer material or to knead a polymer material together with a surfactant. However, in this method, the surfactant merely adheres to the surface of the polymer material, and therefore the surfactant rubs off the polymer material surface due to minute friction or to exposure to a highly humid atmosphere, or it is washed away together with water droplet adhered to the polymer material surface. As a result, the effect of the surfactant is lost in a very short period of time (Yukagaku, 14, 571 (1965) published by Oil Chemist Society; Engineering Materials, 13, No. 11, page 14, (1965)). In the latter method, the surfactant bleeds to the surface of the polymer material to make the surface sticky or to cause a blocking tendency in the surface, and further the surfactant remains in the interior of the polymer material and the effect of the surfactant does not reach the surface of the polymer material (Journal of the Chemical Society of Japan, Industrial Chemical Section, 68, 2209 (1965)).

Recently, it has been attempted to modify the surface of a polymer material by adding to the polymer material a block or graft copolymer consisting of a polymer portion having a hydrophilic property and a polymer portion having a hydrophobic property.

For example, Advances in Chem., No. 142, page 320 (1975) discloses a method, wherein an AB type block copolymer having a hydrophobic poly(N-lauroyl-ethyleneimine) portion, which is compatible with nylon fiber, and a hydrophilic poly(N-propionyl-ethyleneimine) portion is synthesized through a cationic ring-opening polymerization, and the resulting AB type block copolymer is added to the nylon fiber to give a hydrophilic property to the fiber surface. Further, J. Macromol. Sci.-Chem., A13(3), 401(1979) discloses a method, wherein an AB or ABA type block copolymer consisting of a hydrophobic polystyrene portion and a hydrophilic tetrahydrofuran portion is synthesized through anionic living polymerization and cationic living polymerization, and the block copolymer is added to polystyrene to give a hydrophilic property to the polystyrene surface.

However, the above described methods for synthesizing a block copolymer are ionic polymerization methods. Therefore, the polymerization reaction does not proceed satisfactorily due to the influence of a slight amount of water or metal ion which are apt to be incorporated into the reaction system during the polymerization step, or complicated polymerization steps are required, and hence the above described method for synthesizing the block copolymers are not suitable for industrial purposes.

Journal of the Adhesion Society of Japan, Vol. 17, No. 9, page 391 (1981) discloses a method for giving a hydrophilic property to the surface of polymethyl methacrylate, wherein a vinyl-polymerizable double bond is added to one end of the molecular chain of polymethyl methacrylate to produce a macromonomer, the macromonomer is copolymerized with hydroxyethyl methacrylate to produce a graft copolymer having a branch consisting of hydrophobic polymethyl methacrylate portion and a backbone consisting of hydrophilic polyhydroxyethyl methacrylate portion, and the graft copolymer is added to the polymethyl methacrylate. However, the graft copolymer obtained in the above described method, which consists of a hydrophilic polymer portion and a hydrophobic polymer portion, is very complicated in the synthesis method. Moreover, the molecular weight of the macromonomer must be kept to a relatively low molecular weight (number average molecular weight: 1,000-10,000) in order to maintain its reactivity for polymerization, and therefore the polymethyl methacrylate portion, which forms the branch of the graft copolymer, is an oligomer having a number average molecular weight of not larger than 10,000. Accordingly, when such graft polymer is added to polymethyl methacrylate in order to modify it, the graft copolymer cannot be always fully retained in the polymethyl methacrylate due to the low molecular weight of the polymethyl methacrylate portion in the branch, and therefore it is doubtful that the graft copolymer is permanently effective for modifying the surface of the polymethyl methacrylate.

As described above, the surface of a polymer material has not yet been fully and satisfactorily modified in an industrially easy method.

Bearing these problems in mind, the inventors have made various investigations and found out a surprising effect that, when a block copolymer consisting of a polymer portion having a hydrophilic property (hereinafter, referred to as a hydrophilic polymer portion), and a polymer portion having a compatibility with a polymer material to be modified, both of which polymer portions having been synthesized in the presence of a polymeric peroxide, is added to a polymer material, the surface of the polymer material can be industrially easily and permanently modified. As the result, the present invention has been accomplished.

SUMMARY OF THE INVENTION

The feature of the present invention lies in a method for modifying the surface of a polymer material, comprising adding a block copolymer consisting of a polymer portion compatible with the polymer material and a hydrophilic polymer portion to the polymer material, said block copolymer having been produced through the following first and second steps, in the first step, either a vinyl monomer which forms a hydrophilic polymer, or a vinyl monomer which forms a polymer compatible with the polymer material, is polymerized in the presence of a polymeric peroxide or a polyazo compound as a polymerization initiator to produce a peroxy bond- or azo bond-containing polymer, and in the second step, either a vinyl monomer which forms a hydrophilic polymer, or a vinyl monomer which forms a polymer compatible with the polymer material, both the vinyl monomers being used in such a manner that, when a hydrophilic polymer is produced in the first step, a vinyl monomer which forms a polymer compatible with the polymer material is used in the second step, and when a polymer compatible with the polymer material is produced in the first step, a vinyl monomer which forms a hydrophilic polymer is used in the second step, is polymerized in the presence of a polymerization initiator of the peroxy bond-containing polymer obtained in the first step.

DESCRIPTION OF THE PREFERRED EMBODIMENT

The polymerization mechanism in the production of the block copolymer of the present invention in the presence of a polymeric peroxide as a polymerization initiator can be explained as follows, for example, in the case where a vinyl monomer which forms a hydrophilic polymer is used in the first step, and a vinyl monomer which forms a polymer compatible with a polymer material is used in the second step. That is, when a vinyl monomer which forms a hydrophilic polymer is polymerized in the presence of a polymeric peroxide, a hydrophilic polymer having peroxy bonds in its molecular chain is firstly obtained, and when the resulting peroxy bond-containing hydrophilic polymer is polymerized together with a vinyl monomer which forms a polymer compatible with a polymer material, the peroxy bond-containing polymer is cleaved at the peroxy bonds contained therein, and the desired block copolymer is obtained very efficiently.

In the thus obtained block copolymer, the molecular weights of the hydrophilic polymer portion and the polymer portion compatible with a polymer material can be freely controlled, and particularly, can be made into a molecular weight considerably higher than that of the block or graft copolymer obtained by a conventional method. Accordingly, when the block copolymer of the present invention is added to a polymer material having a compatibility with the block copolymer in its polymer portion compatible with the polymer material, the hydrophilic polymer portion of the block copolymer moves to the surface of the polymer material due to its poor compatibility with the polymer material, and modifies the surface of the polymer material; while that polymer portion of the block copolymer which is compatible with the polymer material is strongly catched by the polymer material, and therefore the block copolymer is neither rubbed off by friction in the polymer material surface nor flowed away by the water-droplets once adhered to the polymer material surface, that is, the block copolymer is free from the removal by external factors, and the effect for modifying the polymer material surface continues permanently.

The above described polymer material includes resin, fiber and rubber made of synthetic polymer and natural polymer, such as plastics, paint, fiber, film, cloth, adhesive, sealant, and further all materials made of polymer.

As the synthetic polymer material, there can be mentioned polyacrylic resin, polyvinyl chloride resin, polyvinylidene chloride resin, polystyrene resin, ABS resin, styrene-butadiene resin, AS resin, polyethylene resin, polypropylene resin, chlorinated polyethylene resin, chlorinated polypropylene resin, polyamide resin, polyester resin, epoxy resin, polyphenylene oxide resin, polycarbonate resin, modified polypropylene oxide resin, polyurethane resin, nitrocellulose resin, cellulose acetate resin, ethylcellulose resin, cellulose acetate butyrate resin, cellulose acetate propionate resin, ethylene-vinyl acetate resin, urea resin, melamine resin, polyvinyl ether resin, petroleum resin, coumarone resin, indene resin, phenolic resin, acetal resin, acrylonitrile-butadiene rubber, chloroprene rubber, acrylic rubber, butyl rubber, polybutadiene rubber, polyisoprene rubber, ethylene-propylene-diene rubber, polyacrylic fiber, nylon fiber, polyester fiber, polyvinyl alcohol fiber, polyvinyl chloride fiber, polyvinylidene chloride fiber, polyethylene fiber, polypropylene fiber, polyurethane fiber and polyvinyl acetal fiber. As the natural polymer material, there can be mentioned rosin, natural rubber, cotton, linen, wool and silk.

The polymeric peroxide to be used in the production of the block copolymer of the present invention is a compound having at least two peroxy bonds in one molecule.

As the polymeric peroxide, there can be used a polymeric peroxide having the following general formula (I)

wherein $R_1$ represents an alkylene or substituted alkylene group having 1-18 carbon atoms, a cycloalkylene or substituted cycloalkylene group having 3-15 carbon atoms, a phenylene group or a substituted phenylene group having 7-18 carbon atoms; $R_2$ represents an alkylene or substituted alkylene group having 2-10 carbon atoms,

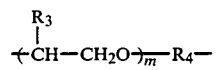

(wherein $R_3$ represents a hydrogen atom or a methyl group, $R_4$ represents an alkylene or substituted alkylene group having 2-10 carbon atoms, and m is an integer of 1-13),

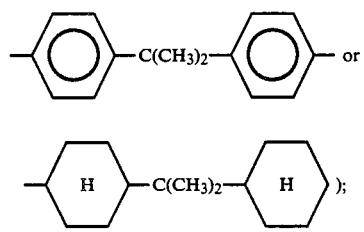

and n is an integer of 2-20, a polymeric peroxide having the following general formula (II)

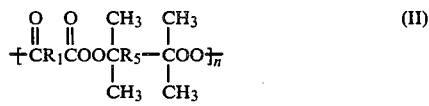

wherein $R_1$ and n have the same meanings as in the general formula (I); and $R_5$ represents an ethylene group, a phenylene group or an acetylene group, a polymeric peroxide having the following general formula (III)

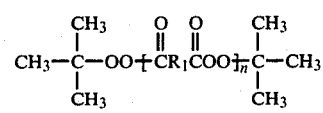  (III)

wherein $R_1$ and n have the same meanings as in the general formula (I), a polymeric peroxide having the following general formula (IV)

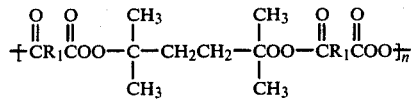  (IV)

wherein $R_1$ and n have the same meanings as in the general formula (I), a polymeric peroxide having the following general formula (V)

  (V)

wherein $R_1$ and n have the same meanings as in the general formula (I), a polymeric peroxide having the following general formula (VI)

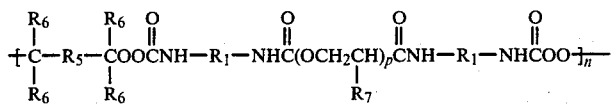  (VI)

wherein $R_1$ and n have the same meanings as in the general formula (I); $R_5$ has the same meaning as in the general formula (II); $R_6$ and $R_7$ represent a hydrogen atom or a methyl group; and p is an integer of 1–100, and a polymeric peroxide having the following general formula (VII)

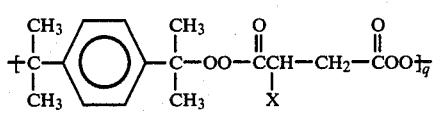  (VII)

wherein X represents a hydrogen atom, a methyl group or a chlorine atom, and q is an integer of 2–50.

The polymeric peroxide having the general formula (I)

  (I)

includes

-continued

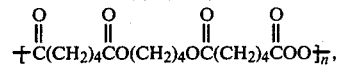

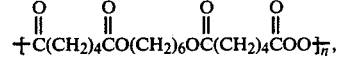

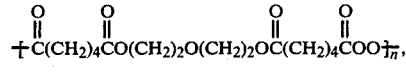

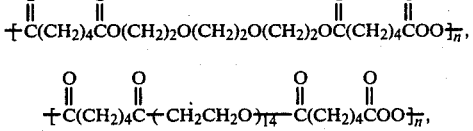

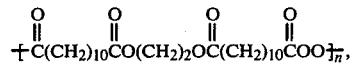

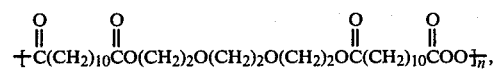

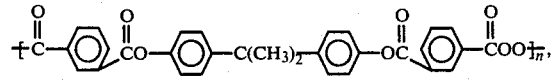

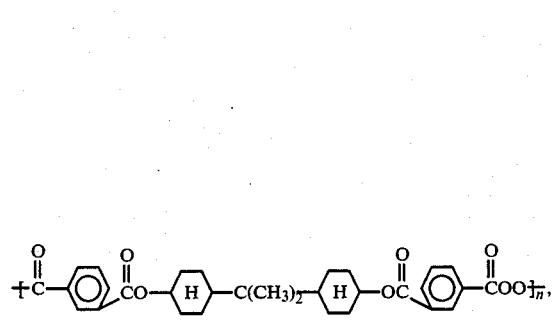

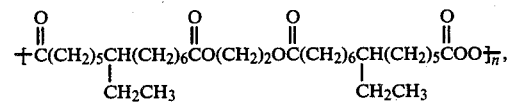

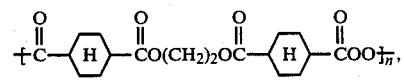

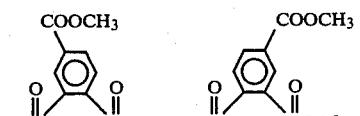

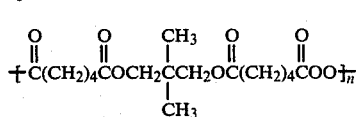

and the like.

The polymeric peroxide having the general formula (II)

$$\{CR_1COOCR_5-COO\}_{\overline{n}}\quad\text{(II)}$$
(with methyl groups on the central carbons)

includes $$\{C(CH_2)_4COOC(CH_3)_2CH_2CH_2C(CH_3)_2COO\}_{\overline{n}},$$

$$\{C(CH_2)_4COOC(CH_3)_2-C\equiv C-C(CH_3)_2COO\}_{\overline{n}},$$

$$\{C(CH_2)_{10}COOC(CH_3)_2CH_2CH_2C(CH_3)_2COO\}_{\overline{n}},$$

$$\{C(CH_2)_{10}COOC(CH_3)_2-C\equiv C-C(CH_3)_2COO\}_{\overline{n}},$$

$$\{C(CH_2)_5CH(CH_2CH_3)(CH_2)_6COOC(CH_3)_2CH_2CH_2C(CH_3)_2COO\}_{\overline{n}},$$

$$\{C(CH_2)_5CH(CH_2CH_3)(CH_2)_6COOC(CH_3)_2-C\equiv C-C(CH_3)_2COO\}_{\overline{n}},$$

$$\{C\text{-cyclohexyl-}COOC(CH_3)_2CH_2CH_2C(CH_3)_2COO\}_{\overline{n}},$$

$$\{C\text{-cyclohexyl-}COOC(CH_3)_2-C\equiv C-C(CH_3)_2COO\}_{\overline{n}},$$

$$\{C\text{-phenyl-}COOC(CH_3)_2CH_2CH_2C(CH_3)_2COO\}_{\overline{n}},$$

$$\{C\text{-phenyl-}COOC(CH_3)_2-C\equiv C-C(CH_3)_2COO\}_{\overline{n}},$$

$$\{C\text{-(COOCH}_3\text{)-phenyl-}COOC(CH_3)_2CH_2CH_2C(CH_3)_2COO\}_{\overline{n}},$$

$$\{C\text{-(COOCH}_3\text{)-phenyl-}COOC(CH_3)_2-C\equiv C-C(CH_3)_2COO\}_{\overline{n}},$$

and the like.

The polymeric peroxide having the general formula (III)

$$CH_3-C(CH_3)_2-OO\{CR_1COO\}_{\overline{n}}C(CH_3)_2-CH_3 \quad\text{(III)}$$

includes $$CH_3-C(CH_3)_2-OO\{C(CH_2)_4COO\}_{\overline{n}}C(CH_3)_2-CH_3,$$

$$CH_3-C(CH_3)_2-OO\{C(CH_2)_{10}COO\}_{\overline{n}}C(CH_3)_2-CH_3,$$

$$CH_3-C(CH_3)_2-OO\{C(CH_2)_5CH(CH_2CH_3)(CH_2)_6COO\}_{\overline{n}}C(CH_3)_2-CH_3,$$

$$CH_3-C(CH_3)_2-OO\{C\text{-cyclohexyl-}COO\}_{\overline{n}}C(CH_3)_2-CH_3,$$

$$CH_3-C(CH_3)_2-OO\{C\text{-phenyl-}COO\}_{\overline{n}}C(CH_3)_2-CH_3,$$

$$CH_3-C(CH_3)_2-OO\{C\text{-(COOCH}_3\text{)-phenyl-}COO\}_{\overline{n}}C(CH_3)_2-CH_3,$$

and the like.

The polymeric peroxide having the general formula (IV)

$$\{CR_1COO-C(CH_3)_2-CH_2CH_2-C(CH_3)_2-COO-CR_1COO\}_{\overline{n}} \quad\text{(IV)}$$

includes

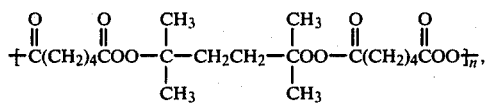
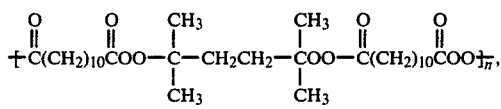
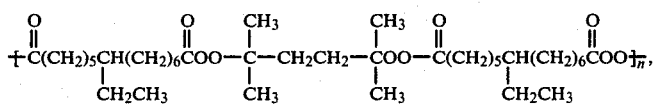
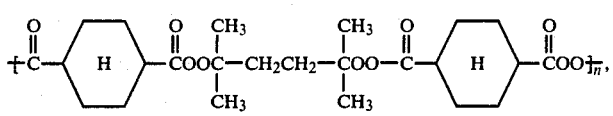
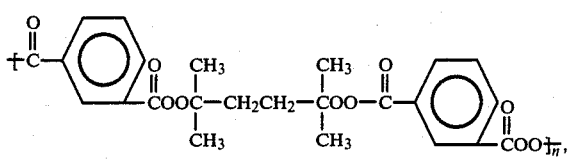
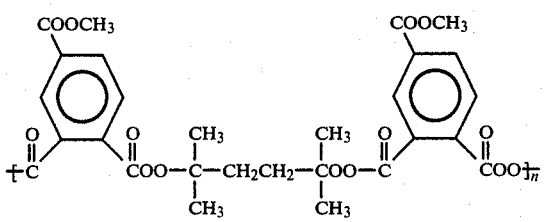
and the like.
The polymeric peroxide having the general formula (V)
 (V)
includes
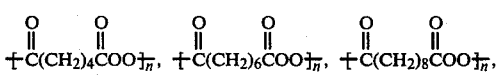
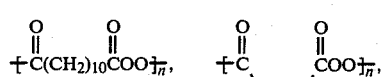
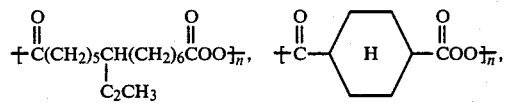
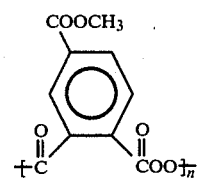
and the like.
The polymeric peroxide having the general formula (VI)
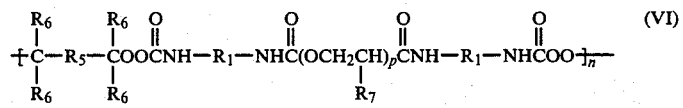 (VI)
includes
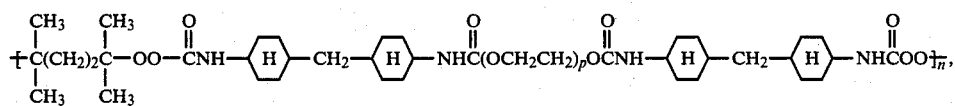

-continued

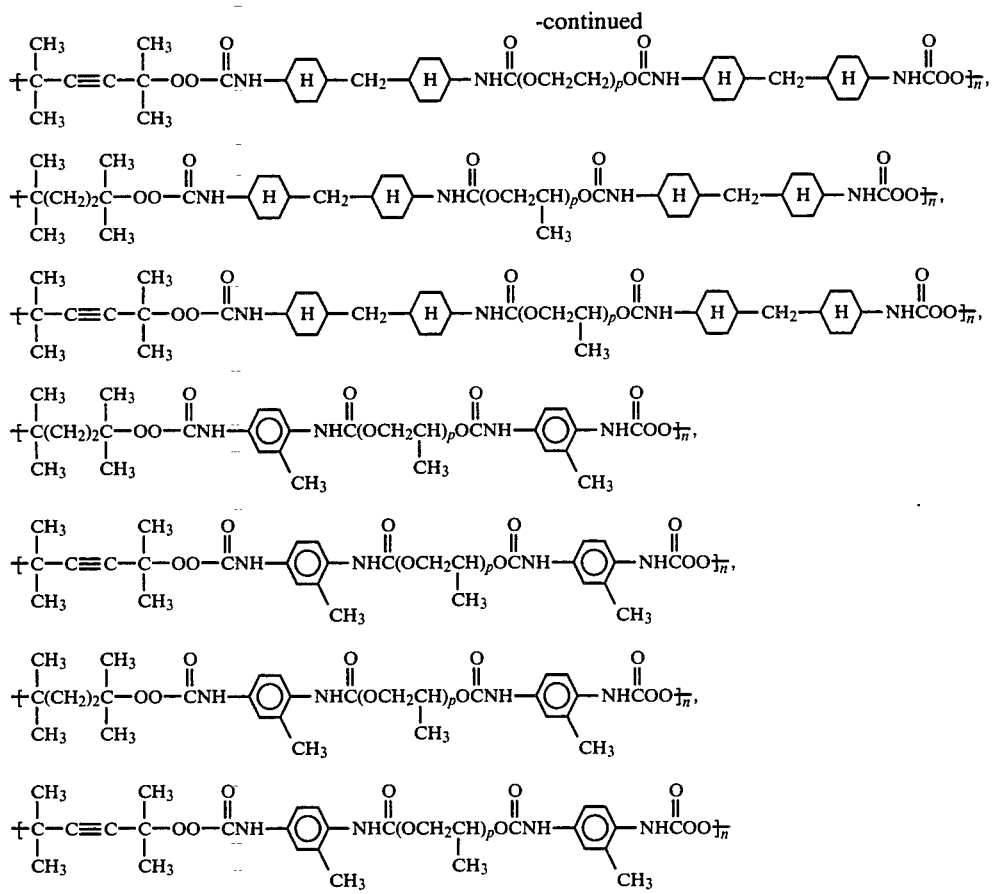

and the like.

The polymeric peroxide having the general formula (VII)

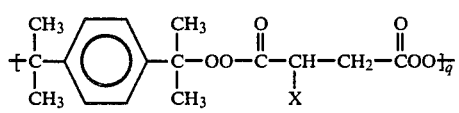  (VII)

includes

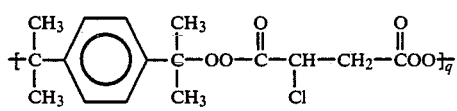

and the like.

The vinyl monomer, which forms a hydrophilic polymer constituting one of the molecular chains of the block copolymer to be used in the present invention, includes radical polymerizable unsaturated carboxylic acids, such as (meth)acrylic acid (hereinafter, the term "(meth)acrylic acid" means arcylic acid and methacrylic acid), itaconic acid, crotonic acid and the like, and their alkali metal salt, ammonium salt and organic amine salt; radical polymerizable unsaturated monomers having a sulfone group, such as styrene sulfonic acid and the like, and their alkali metal salt, ammonium salt and organic amine salt; quaternary ammonium salt derived from (meth)acrylic acid, such as 2-hydroxy-3-methacryloxypropyl-trimethylammonium chloride; methacrylic acid ester of alcohol having tert.-amino group, such as methacrylic acid diethylamino ester, and its quaternary ammonium salt; radical polymerizable unsaturated monomer containing amide group, such as (meth)acrylamide; quaternary ammonium salt derived from amide-amine obtained from methylacrylic acid and diamine; hydroxyesters of (meth)acrylic acid, such as (meth)acrylic acid hydroxyethyl ester and (meth)acrylic acid hydroxpropyl ester; polyethylene glycol or polypropylene glycol ester of (meth)acrylic acid, such as (meth)acrylic acid diethylene glycol ester, (meth)acrylic acid triethylene glycol ester and (meth)acrylic acid dipropylene glycol ester; polyhydric alcohol ester of (meth)acrylic acid, such as (meth)acrylic acid monoglyceride; phosphate of (meth)acrylic acid, such as mono(2-hydroxyethyl acrylate) acid phosphate; vinylpyridine and its salt; vinylpyrrolidone; and the like. Further, the above described vinyl monomer may be used together with other vinyl monomer so long as the resulting polymer does not deteriorate the function as a hydrophilic polymer.

The vinyl monomer, which forms a polymer having a compatibility with a polymer material to be modified and constituting the other molecular chain of the block copolymer to be used in the present invention, is properly selected depending upon the compatibility of the polymer with the base resin of the polymer material. As the vinyl monomer, there can be used, for example, (meth)acrylic acid esters, such as methyl (meth)acrylate, ethyl (meth)acrylate, n-propyl (meth)acrylate, isopropyl (meth)acrylate, glycidyl (meth)acrylate, n-butyl (meth)acrylate, isobutyl (meth)acrylate, tert.-butyl (meth)acrylate, n-hexyl (meth)acrylate, cyclohexyl (meth)acrylate, 2-ethylhexyl (meth)acrylate, octyl (meth)acrylate, lauryl (meth)acrylate, stearyl (meth)acrylate and the like; aromatic vinyl monomers, such as styrene, vinyltoluene, α-methylstyrene and the like; carboxylic acid vinyl esters, such as vinyl formate, vinyl acetate, vinyl propionate, vinyl stearate and the like; butadiene, vinyl chloride, vinylidene chloride (meth)acrylonitrile, (meth)allyl glycidyl ether and the like.

The compatibility of a vinyl polymer with a polymer material to be modified is judged by a visual observation of a film of a mechanically kneaded homogeneous mixture of the polymer material and the vinyl polymer. That is, when the film is transparent, or when, although the film is not transparent, a vinyl polymer is homogeneously dispersed in a polymer material, the vinyl polymer is judged to be compatible with the polymer material. When a vinyl polymer is poor in the compatibility with a polymer material, the particles of the vinyl polymer are dispersed in the polymer material in the form of a visible particle size, and the mixture is a heterogeneous blend.

Compatibility of typical mutual polymers is disclosed in J. Macromol. Sci., C7, 251 (1972), and in Journal of the Adhesion Society of Japan, Vol. 17, No. 1, page 2 (1975). Some of combinations of a polymer material and a vinyl polymer compatible therewith are as follows.

| Polymer material | Compatible vinyl polymer |
| --- | --- |
| Polymethyl methacrylate resin (for example, trademark: Acrypet M, made by Mitsubishi Rayon Co., Ltd.) | Polymethyl methacrylate, Styrene/methyl methacrylate copolymer, Polyvinyl chloride, Methyl vinyl ether/maleic anhydride copolymer |
| Polyvinyl chloride resin (for example, trademark: Nikavinyl P1050, made by Nippon Carbide Industries Co., Ltd.) | Polyvinyl chloride, Polymethyl methacrylate, Polyethyl methacrylate, Polybutyl methacrylate, Polychloroprene, Acrylonitrile/butadiene copolymer, Ethylene/vinyl acetate copolymer, Methyl methacrylate/ethyl methacrylate copolymer |
| Polystyrene resin (for example, trademark: Styron 666, made by Asahi-Dow Limited) | Polystyrene, Polyvinyl methyl ether |
| Ethylene-vinyl acetate resin (for example, trademark: Soarlex R-FH, made by Nippon Synthetic Chemical Industry Co., Ltd.) | Polyvinyl acetate, Polyvinyl chloride, Polyvinylidene chloride, Vinyl chloride/vinyl acetate copolymer, Vinyl chloride/vinyl acetate/acrylic acid ester copolymer, Ethylene/vinyl acetate copolymer |
| Polyethylene resin | Polybutadiene Ethyl acrylate/acrylonitrile copolymer, Polyethyl acrylate, Polyethylene |
| Polyvinyl methyl ether resin | Polystyrene |
| Vinyl chloride-vinyl acetate resin (for example, trademark: S-lec C, made by Sekisui Chemical Co., Ltd.) | Polymethyl methacrylate Acrylonitrile/butadiene copolymer, Vinyl chloride/vinyl acetate copolymer |
| Styrene-maleic anhydride resin (for example, trademark: Stylite CM-2, made by Daido Industry Co., Ltd.) | Polymethyl methacrylate Polyvinyl acetate, Styrene/maleic anhydride copolymer |
| Polyester resin (for example, trademark: Ester Resin 20, made by Toyo Boseki Co., Ltd.) | N—vinylpyrrolidone/vinyl acetate copolymer, Vinyl chloride/vinylidene chloride/acrylic acid ester copolymer |
| Polyphenylene oxide resin | Polystyrene |
| Polyurethane resin (for example, trademark: 5740 × 1, made by Nippon Zeon Co., Ltd.) | Polyvinyl chloride, Polyvinylidene chloride, Vinyl chloride/vinyl acetate copolymer, N—vinylpyrrolidone/vinyl acetate copolymer |
| Nitrocellulose (for example, trademark: RS-½, made by Asahi Chemical Industry Co., Ltd.) | Polyvinyl acetate, Polymethyl methacrylate, Polymethyl acrylate |
| Cellulose acetate butyrate (for example, trademark: EAB-381-2, made by Eastman Chem. Co.) | Polyvinyl acetate, Ethylene/vinyl acetate copolymer |
| Petroleum resin (for example, trademark: Nisseki Neopolymer 150, made by Nippon Petrochemicals Co., Ltd.) | Polystyrene, N—vinylpyrrolidone/vinyl acetate copolymer, |
| Coumarone resin (for example, trademark: TG, made by Mitsubishi Chemical Industries, Ltd.) | Polystyrene, N—vinylpyrrolidone/vinyl acetate copolymer |
| Indene resin (for example, trademark: VM-½, made by Nippon Steel Corporation) | Polystyrene, Polymethyl methacrylate, Polyvinyl chloride, Polyvinylidene chloride, Vinyl chloride/vinyl acetate copolymer, Ethylene/vinyl acetate copolymer |
| Acrylic fiber | Polyacrylonitrile, Acrylonitrile/methyl acrylate resin |
| Nylon fiber | Polyacrylamide, Acrylamide/acrylic acid ester copolymer |
| Vinylidene chloride fiber (for example, trademark: Krehalon, made by Kureha Chemical Industry Co., Ltd.) | N—vinylpyrrolidone/vinyl acetate copolymer, Ethylene/vinyl acetate copolymer |
| Acrylonitrile-butadiene rubber (for example trademark: Hycar 1043, made by Nippon Zeon Co., Ltd.) | Polyvinyl chloride, Vinyl chloride/vinyl acetate copolymer |
| Polyisoprene rubber | Polymethyl methacrylate |
| Polychloroprene rubber | Polyvinyl chloride |
| Polyether rubber (polyepichlorohydrin) | Styrene/acrylonitrile copolymer, Styrene/methyl methacrylate copolymer |
| Natural rubber | Polymethyl methacrylate |

In order to improve moreover the compatibility of the polymer material with the vinyl polymer portion of the block copolymer of the present invention, a vinyl monomer having a functional group reactive with the functional group contained in the polymer material may be copolymerized into the vinyl polymer portion having a compatibility with the polymer material.

Further, other vinyl monomer which forms a hydrophobic polymer may be copolymerized into the vinyl polymer portion having a compatible with a polymer material to be modified so long as the vinyl polymer portion does not deteriorate its compatibility with the polymer material.

The block polymer of the present invention can be easily produced by using a commonly known polymeric peroxide in an ordinary bulk polymerization process, suspension polymerization process, solution polymerization process or emulsion process. In this case, in the production of the peroxy bond-containing polymer, which acts as a precursor of the block copolymer to be used in the present invention, the use amount of a polymeric peroxide or a polyazo compound is preferably 0.5-20 parts by weight based on 100 parts by weight of a vinyl monomer to be used for the production of the peroxy bond-containing polymer, the polymerization temperature is preferably 60°-130° C. and the polymerization time is preferably 2-10 hours. In the production of the peroxy bond-containing polymer, the polymeric peroxide can be used alone or in admixture of at least two members.

The block copolymer to be used in the present invention is preferably produced by using the peroxy bond-containing polymer as a polymerization initiator under a condition of a polymerization temperture of 60°-140° C. and a polymerization time of 3-15 hours. The weight ratio of the hydrophilic polymer portion to the polymer portion compatible with polymer material in a block copolymer is preferably 1/19-19/1, more preferably 1/9-9/1. A block copolymer having not more than 5% by weight of a hydrophilic polymer portion is poor in the effect for modifying the surface of polymer material, and a block copolymer having not more than 5% by weight of a polymer portion compatible with polymer material is poor in the compatibility with the polymer material, and it is difficult to maintain permanently the effect for modifying the surface of polymer material.

As the methods for adding the block copolymer of the present invention to a polymer material to be modified, there can be used a method, wherein a solution or dispersion of a block copolymer in a solvent is coated on the surface of the polymer material; a method wherein a block copolymer is mixed with a polymer material during its forming, or a block copolymer is dissolved in a solvent together with a polymer material, and then the mixture of the block copolymer and the polymer material is formed into a film; a method wherein a block copolymer is previously formed into a sheet, and the block copolymer sheet is pressed and adhered to a polymer material surface at a high temperature or is adhered to the surface by means of an adhesive; a method wherein powders of a block copolymer as such are welded to a polymer material surface; and the like. The addition amount of the block copolymer to a polymer material is preferably within the range of 0.1-20 parts by weight based on 100 parts by weight of the polymer material. When the addition amount is less than 0.1 part by weight, the effect of the block copolymer of the present invention does not fully appear, and when the addition amount exceeds 20 parts by weight, the characteristic properties of polymer material may be lost.

The block copolymer of the present invention can be added alone to a polymer material to be modified, but may be added to the polymer material together with commonly known surfactants, for example, anionic surfactants, such as alkyl phosphate and the like; cationic surfactants, such as laurylbenzylammonium chloride, trimethyldodecylammonium chloride, polyoxyethylenealkylamine and the like; and betain type and imidazoline type amophoteric surfactants. The use amount of these surfactants is preferably 0-50% by weight based on the amount of the block copolymer of the present invention. When the amount of the surfactant is larger than 50% by weight, the effect of the present invention does not fully appear.

According to the present invention, when a block copolymer is properly selected depending upon the polymer material to be modified in its surface, the block copolymer can modify effectively the surface of various polymer materials. That is, the block copolymer is very effective not only as an antistatic agent for various polymer materials, but also as an anticlouding agent for preventing the adhesion of water-droplet to food wrap films, agricultural films and the like. Further, the block copolymer is very effective as an improver for the adaptability of medical plastics to living body, as an improver for the adhesivity, printability, paintability and platability of the surface of various plastic materials, as an improver for the dyeability of synthetic fibers, and as an improver for the hygroscopicity of fibrous materials for clothing. In addition, the use of the block copolymer in the paint, kitchenware and the like can be expected.

The following examples are given for the purpose of illustration of this invention and are not intended as limitations thereof. In the examples, "parts" and "%" mean by weight.

EXAMPLE 1

(A) Production of a peroxy bond-containing polymer

Into a reactor equipped with a thermometer, a stirrer and a reflux condenser was charged 90 parts of isopropyl alcohol, and while introducing nitrogen gas into the reactor and heating the reaction system at 70° C., a mixed solution (I) consisting of

| | |
|---|---|
| isopropyl alcohol | 30 parts |
| polyethylene glycol monomethacrylate[(1)] and | 30 parts |
| $+C(CH_2)_4CO(C_2H_4O)_3C(CH_2)_4COO+_{5.5}$ with each C=O shown | 6 parts |

[(1)]trademark: Blemmer PE 350, made by Nippon Oil and Fats Co., Ltd. (addition product of 7-9 moles of ethylene oxide to 1 mole of methacrylic acid)

was charged into the reactor in 2 hours, and a polymerization reaction was further effected for 2 hours. The resulting solution was a transparent solution containing 23.1% of a peroxy bond-containing polymer and having a viscosity of 2.5 poises at 25° C.

(B) Production of a block copolymer

In a reactor equipped with a thermometer, a stirrer and a reflux condenser, a mixed solution (II) consisting of 100 parts of the isopropyl alcohol solution of peroxy bond-containing polymer produced in the above described Step (A) and 20 parts of styrene was heated at 70° C. while blowing nitrogen gas into the reactor, to effect a block copolymerization reaction and to obtain a milk-white dispersion containing 42.8% of a block copolymer and having a viscosity of 1.2 poises at 25° C. The resulting dispersion was poured into 2 l of water while stirring vigorously the resulting mixture, to precipitate the copolymer, and the precipitate was filtered and dried to obtain the block copolymer.

(C) Modification of the surface of a polymer material

A mixture of 100 parts of polystyrene resin powder and 5 parts of the block copolymer obtained in the above described Step (B) was kneaded in and extruded through an extruder into a sheet, and the sheet was press molded to produce a sheet having a thickness of 0.5 mm. The sheet was free from both coloration and bleeding and had a good processability. As a blank, a sheet consisting only of polystyrene resin was produced. The surface resistivity and the contact angle with pure water of these two sheets were measured (measuring environment: relative humidity: 30%, temperature: 20° C.). The obtained results are shown in the following Table 1.

TABLE 1

|  | Surface resistivity (1) ($\Omega$) | Contact angle (2) (°) |
|---|---|---|
| Addition of block copolymer | $3 \times 10^6$ | 50 |
| No addition of block copolymer | $5 \times 10^{15}$ | 95 |

(1) Measured by means of a surface resistance-measuring apparatus made by Sanko Seiki Co., Ltd.
(2) Measured by means of a contact angle-measuring apparatus, type G-I, made by Erma Optical Works, Ltd.

It can be seen from Table 1 that the polystyrene resin sheet containing the block copolymer of the present invention is remarkably lower in the surface resistivity and in the contact angle than the blank, and the use of the block copolymer exhibits a distinctly excellent effect for modifying the surface of polymer material. Further, even when the surface of the modified resin sheet was washed with city water at 25° C. for 1 hour at a flow rate of 2 l/min, the above described effect of the block copolymer of the present invention was not at all deteriorated.

EXAMPLE 2

(A) Production of a peroxy bond-containing polymer

Into a reactor equipped with a thermometer, a stirrer and a reflux condenser was charged 60 parts of methyl alcohol, and while blowing nitrogen gas into the reactor and under a reflux of methyl alcohol, a mixed solution (II) consisting of

| methyl alcohol | 60 parts |
| N,N—di(polyoxyethylene)aminoethyl-methacrylamide (n + m = 10) and | 60 parts |
| $+C(CH_2)_4CO(C_2H_4O)_3C(CH_2)_4COO+_{\overline{5.5}}$ (O O O O, four double bonds) | 9 parts | was charged into the reactor in 2 hours, and a polymerization reaction was further effected for 2 hours. The resulting solution was a transparent solution containing 35.0% of a peroxy bond-containing polymer and having a viscosity of 3.3 poises at 25° C.

(B) Production of a block copolymer

In a reactor equipped with a thermometer, a stirrer and a reflux condenser, a mixed solution (IV) consisting of 100 parts of the methanol solution of peroxy bond-containing polymer obtained in the above described Step (A) and 30 parts of methyl methacrylate was heated for 8 hours under a reflux of methyl alcohol while blowing nitrogen gas into the reactor, to effect a block copolymerization reaction and to obtain a milk-white dispersion containing 64.7% of a block copolymer and having a viscosity of 15 poises at 25° C. The resulting dispersion was poured into 2 l of water while stirring vigorously, to precipitate the copolymer. The precipitate was filtered and dried to obtain the block copolymer.

(C) Modification of the surface of a polymer material

In ethyl acetate 100 parts of polymethyl methacrylate resin and 5 parts of the block copolymer obtained in the above described Step (B) were dissolved, and a film was produced by solvent casting. The film was free from both coloration and bleeding. As a blank, a film consisting only of polymethyl methacrylate was produced. The surface resistivity of both films and that of the films after rubbing were measured. (The measuring environment is the same as that in Example 1.) The obtained results are shown in the following Table 2.

TABLE 2

|  | Surface resistivity ($\Omega$) | Surface resistivity after rubbing (3) ($\Omega$) |
|---|---|---|
| Addition of block copolymer | $7 \times 10^6$ | $7 \times 10^6$ |
| No addition of block copolymer | $5 \times 10^{16}$ | $5 \times 10^{16}$ |

(3) After a sample film was rubbed with a cotton cloth for 3 minutes at an r.p.m. of 150, the surface resistivity of the film was measured by mean of a rotary static tester made by Koa Shokai.

It can be seen from Table 2 that the polymethyl methacrylate resin film containing the block copolymer of the present invention does not substantially change in its surface resistivity even when the surface of the resin film is rubbed, and the use of the block copolymer exhibits a distinctly excellent antistatic effect. Further, even when the surface of the modified resin films, before and after the rubbing was washed with city water at 25° C. for 1 hour at a flow rate of 2 l/min, the above described effect of the block copolymer was not at all deteriorated.

EXAMPLE 3

(A) Production of a peroxy bond-containing polymer

Into a reactor equipped with a thermometer, a stirrer and a reflux condenser was charged 90 parts of methyl alcohol, and while blowing nitrogen gas into the reactor and under a reflux of methyl alcohol, a mixed solution (V) consisting of

| deionized water | 30 parts |
| 2-hydroxy-3-methacryloxypropyltrimethyl-ammonium chloride (trademark: Blemmer QA, made by Nippon Oil and Fats Co., Ltd.) and | 30 parts |
| $+C(CH_2)_4CO(CH_2)_4OC(CH_2)_4COO+_{\overline{4.5}}$ (O O O O, four double bonds) | 6 parts | was charged into the reactor in 1 hour, and a polymerization reaction was further effected for 2 hours. The resulting solution was a transparent solution containing 23.0% of a peroxy bond-containing polymer and having a viscosity of 2.2 poises at 25° C.

(B) Production of a block copolymer

In a reactor equipped with a thermometer, a stirrer and a reflux condenser, a mixed solution (VI) consisting of 100 parts of the water-methanol solution of peroxy bond-containing polymer produced in the above described Step (A) and 20 parts of methyl methacrylate was heated for 8 hours under a reflux of methanol while blowing nitrogen gas into the reactor, to effect a block copolymerization reaction and to obtain a milk-white dispersion containing 42.5% of a block copolymer and having a viscosity of 0.5 poise at 25° C. The resulting dispersion was poured into 2 l of water while stirring vigorously the resulting mixture, to precipitate the copolymer, and the precipitate was filtered and dried to obtain the block copolymer.

(C) Modification of the surface of a polymer material

A mixture of 100 parts of polyvinyl chloride resin powder and 5 parts of the block copolymer produced in the above described Step (B) was kneaded in and extruded through an extruder into a sheet, and the sheet was press molded into a sheet having a thickness of 0.5 mm. The resulting sheet was free from both coloration and bleeding and had a good processability. As a blank, a sheet consisting only of polyvinyl chloride resin was produced. The surface resistivity and contact angle with pure water of these sheets were measured under the same measuring environment as described in Example 1. The obtained results are shown in the following Table 3.

TABLE 3

|  | Surface resistivity ($\Omega$) | Contact angle (°) |
| --- | --- | --- |
| Addition of block copolymer | $2 \times 10^5$ | 45 |
| No addition of block copolymer | $5 \times 10^{16}$ | 81 |

It can be seen from Table 3 that the polyvinyl chloride resin sheet containing the block copolymer of the present invention is remarkably lower in the surface resistivity and in the contact angle than the blank, and the block copolymer of the present invention is distinctly effective for modifying the surface of polymer material. Further, even when the surface of the above modified polyvinyl chloride resin sheet was washed with city water at 25° C. for 1 hour at a flow rate of 2 l/min, the above described effect of the block copolymer of the present invention was not at all deteriorated.

EXAMPLE 4

(A) Production of a peroxy bond-containing polymer

Into a reactor equipped with a thermometer, a stirrer and a reflux condenser was charged 80 parts of N,N-dimethylformamide, and while blowing nitrogen gas into the reactor and heating the reaction system at 70° C., a mixed solution (VII) consisting of

| | |
| --- | --- |
| N,N—dimethylformamide | 30 parts |
| methyl methacrylate and | 30 parts |
| $+C(CH_2)_4CO(CH_2)_2OC(CH_2)_4COO+_{\overline{1/2}}$ (with four C=O groups) | 6 parts | was charged into the reactor in 2 hours, and a polymerization reaction further was effected for 3 hours. The resulting solution was a transparent solution containing 23.2% of a peroxy bond-containing polymer and having a viscosity of 2.8 poises at 25° C.

(B) Production of a block copolymer

In a reactor equipped with a thermometer, a stirrer and a reflux condenser, a mixed solution (VIII) consisting of 200 parts of the N,N-dimethylformamide solution of peroxy bond-containing polymer obtained in the above described Step (A) and 5 parts of sodium 2-methacrylamide-2-methylpropanesulfonate was heated at 70° C. for 8 hours while blowing nitrogen gas into the reactor, to effect a block copolymerization reaction and to obtain a milk-white dispersion containing 24.8% of a block copolymer and having a viscosity of 0.2 poise at 25° C.

(C) Modification of the surface of a polymer material

The dispersion of block copolymer obtained in the above described Step (B) was applied on an acrylic resin sheet by a bar coating so that a block copolymer film having a thickness of 8 μm would be formed after drying, and the applied dispersion was dried at room temperature for 2 hours and then at 60° C. for 2 hours. As a blank, an acrylic resin sheet as such was used. The surface resistivity and the contact angle with pure water of both the acrylic resin sheets were measured under the same measuring environment as described in Example 1. The obtained results are shown in the following Table 4.

TABLE 4

|  | Surface resistivity ($\Omega$) | Contact angle (°) |
| --- | --- | --- |
| Applied with block copolymer | $8 \times 10^6$ | 45 |
| Not applied with block copolymer | $>5 \times 10^{16}$ | 80 |

It can be seen from Table 4 that the acrylic resin sheet, whose surface has been coated with a film of the block copolymer of the present invention, is remarkably lower in the surface resistivity and in the contact angle than the blank, and the block copolymer of the present invention is distinctly effective for modifying the surface of polymer material. Further, even when the coated surface of the acrylic resin sheet was washed with city water at 25° C. for 1 hour at a flow rate of 2 l/min, the above described effect of the block copolymer of the present invention was not at all deteriorated.

EXAMPLE 5

(A) Production of a peroxy bond-containing polymer

Into a reactor equipped with a thermometer, a stirrer and a reflux condenser was charged 90 parts of methyl alcohol, and while blowing nitrogen gas into the reactor and under a reflux of methyl alcohol, a mixed solution (IX) consisting of

| | |
| --- | --- |
| methyl alcohol | 30 parts |
| polyethylene glycol monomethacrylate[1] and | 30 parts |
| $+C(CH_2)_4CO(C_2H_4O)_3C(CH_2)_4COO+_{\overline{5.5}}$ (with four C=O groups) | 6 parts |

[1]trademark: Blemmer PE 90, made by Nippon Oil and Fats Co., Ltd. (addition product of 2 moles of ethylene oxide to 1 mole of methacrylic acid)

was charged into the reactor in 2 hours, and a polymerization reaction was further effected for 2 hours. The resulting solution was a transparent solution containing 23.1% of a peroxy bond-containing polymer and having a viscosity of 1.8 poises at 25° C.

(B) Production of a block copolymer

In a reactor equipped with a thermometer, a stirrer and a reflux condenser, a mixed solution (X) consisting of 50 parts of the methyl alcohol solution of peroxy bond-containing polymer obtained in the above described Step (A), 60 parts of methyl alcohol and 90 parts of acrylonitrile was heated for 10 hours under a reflux of methyl alcohol while blowing nitrogen gas into the reactor, to effect a block copolymerization reaction and to obtain a milk-white dispersion containing 50.6% of a block copolymer and having a viscosity of 4.5 poises at 25° C. The resulting dispersion was poured into 2 l of water while stirring vigorously the resulting mixture, to precipitate the copolymer, and the precipitate was filtered and dried to obtain the block copolymer.

(C) Modification of the surface of a polymer material

A mixture of 100 parts of polyacrylonitrile and 5 parts of the block copolymer obtained in the above described Step (B) was kneaded in and extruded through an extruder into a monofilament. The monofilament was uniformly wound around a polymethyl methacrylate resin sheet in two layers to produce a test sample. A blank test sample was produced in the same manner as described above, except that polyacrylonitrile alone was kneaded in and extruded through an extruder into a monofilament. The surface resistivity of the test sample and the blank test sample and that of these test samples after rubbing were measured under the same measuring environment as described in Example 1. The obtained results are shown in the following Table 5.

TABLE 5

|  | Surface resistivity ($\Omega$) | Surface resistivity after rubbing ($\Omega$) |
| --- | --- | --- |
| Addition of block copolymer | $3 \times 10^6$ | $3 \times 10^6$ |
| No addition of block copolymer | $5 \times 10^{14}$ | $>10^{16}$ |

It can be seen from Table 5 that the polyacrylonitrile filament containing the block copolymer of the present invention does not substantially change in its surface resistivity even when the surface of the modified filament is rubbed, and the use of the block copolymer exhibits distinctly excellent antistatic effect. Further, even when the surface of the modified filaments, before and after the rubbing, was washed with city water at 25° C. for 1 hour at a flow rate of 2 l/min, the antistatic effect of the block copolymer was not at all deteriorated. It can be seen from the results of the above described experiments that the block copolymer of the present invention has an excellent effect for modifying the surface of fibrous material as well.

EXAMPLE 6

(A) Production of a peroxy bond-containing polymer

A methyl alcohol solution of peroxy bond-containing polymer was produced in the same manner as described in Example 3, Step (A).

(B) Production of a block copolymer

A dispersion of block copolymer was produced in the same manner as described in Example 3, Step (B).

(C) Modification of the surface of a polymer material

To 100 parts of an acrylic varnish for thermoplastic paint was added 1 part of the dispersion of block copolymer produced in the above described Step (B), and the resulting mixture, after its viscosity in Ford cup No. 4 was adjusted to 19–20 seconds, was spray coated on a polymethyl methacrylate resin sheet, which was previously washed with ethanol, and then dried at 60° C. for 1 hour to form a coating film on the resin sheet, which was a test sample. As a blank, a varnish consisting only of an acrylic varnish for thermoplastic paint was used, and the same polymethyl methacrylate resin sheet as described above was coated with a film in the same manner as described above to produce a blank sample. Both the test sample and the blank sample were measured with respect to the surface resistivity and the contact angle with pure water under the same measuring environment as described in Example 1. The obtained results are shown in the following Table 6.

TABLE 6

|  | Surface resistivity ($\Omega$) | Contact angle (°) |
| --- | --- | --- |
| Addition of block copolymer | $3 \times 10^6$ | 45 |
| No addition of block copolymer | $>5 \times 10^{16}$ | 82 |

It can be seen from Table 6 that the polymethyl methacrylate resin sheet coated with a film containing the block copolymer of the present invention is remarkably lower than the blank in the surface resistivity and in the contact angle with pure water, and the block copolymer of the present invention is distinctly effective for modifying the polymer material surface. Further, even when the modified surface of the resin sheet was washed with city water at 25° C. for 1 hour at a flow rate of 2 l/min, the above described effect of the block copolymer was not at all deteriorated.

It can be seen from the results of the above described experiments that the use of the block copolymer of the present invention in a paint is distinctly effective for modifying the surface of a polymer material by forming a coating film on the surface.

EXAMPLES 7–14

(A) Production of a peroxy bond-containing polymer

A peroxy bond-containing polymer was produced in the same manner as described in Example 1, except that a solvent described in the following Table 7 was used in an amount shown in Table 7 in place of 90 parts of isopropyl alcohol used in Example 1, Step (A), and a mixed solution described in Table 7 was used in place of the mixed solution (I) used in Example 1, Step (A). The content (wt.%) of a peroxy bond-containing polymer in the resulting reaction solution, and the viscosity of the reaction solution at 25° C. are shown in Table 7.

TABLE 7(a)

| | | Example | | | | | | | |
|---|---|---|---|---|---|---|---|---|---|
| | | 7 | 8 | 9 | 10 | 11 | 12 | 13 | 14 |
| Solvent[1] (parts) | Methyl alcohol | 90 | — | — | 20 | 20 | 20 | 90 | 60 |
| | Isopropyl alcohol | — | 60 | — | — | — | — | — | — |
| | Toluene | — | — | 60 | — | — | — | — | — |
| Composition of mixed solution[2] (parts) | Methyl alcohol | 30 | — | — | 30 | 30 | 30 | 30 | 60 |
| | Isopropyl alcohol | — | 60 | — | — | — | — | — | — |
| | Toluene | — | — | 60 | — | — | — | — | — |
| | Polyethylene glycol monomethacrylate[3] | — | 60 | — | — | — | 25 | — | — |
| | N,N—Di(polyoxyethylene)aminoethylmethacrylamide (n + m = 10) | — | — | — | — | — | — | 30 | — |
| | 2-Hydroxy-3-methacryloxypropyl-trimethylammonium chloride[4] | — | — | — | 25 | 25 | — | — | 60 |
| | Sodium styrenesulfonate | 30 | — | — | — | — | — | — | — |
| | Methyl methacrylate | — | — | 60 | — | — | — | — | — |
| | $+C(CH_2)_4CO(C_2H_4O)_3C(CH_2)_4COO+_n$ (all four C=O) (n ≅ 5.5) | 6 | — | — | — | — | — | 6 | — |

TABLE 7(b)

| | | Example | | | | | | | |
|---|---|---|---|---|---|---|---|---|---|
| | | 7 | 8 | 9 | 10 | 11 | 12 | 13 | 14 |
| Composition of mixed solution[2] parts | $+C(CH_2)_4CO(C_2H_4O)_{14}C(CH_2)_4COO+_n$ (n ≅ 3.5) | — | 6 | — | — | — | — | — | — |
| | $+C(CH_2)_{10}CO(C_2H_4O)_3C(CH_2)_{10}COO+_n$ (n ≅ 5.5) | — | — | 6 | — | — | — | — | — |
| | $+C-\text{Ph}-CO-\text{H}-C(CH_3)_2-\text{H}-OC-\text{Ph}-COO+_n$ (n ≅ 3.6) | — | — | — | — | 4.5 | — | — | — |
| | $+C(CH_2)_4COOCCH_2CH_2COO+_n$ with CH$_3$ substituents (n ≅ 3.5) | — | — | — | 1 | — | — | — | — |
| | $+C(CH_2)_{10}COOCCH_2CH_2COO+_n$ with CH$_3$ substituents (n ≅ 3.6) | — | — | — | — | — | 4.5 | — | — |

TABLE 7(c)

| | | Example | | | | | | | |
|---|---|---|---|---|---|---|---|---|---|
| | | 7 | 8 | 9 | 10 | 11 | 12 | 13 | 14 |
| Composition of mixed solution[2] (parts) | $+C-\text{Ph}-COOCCH_2CH_2COO+_n$ with CH$_3$ substituents (n ≅ 3.1) | — | — | — | 3.5 | — | — | — | 6 |
| Property of the solution containing a peroxy bond-containing polymer | Content of peroxy bond-containing polymer (%) | 23.0 | 35.1 | 35.0 | 36.7 | 36.5 | 36.6 | 23.1 | 35.0 |
| | Viscosity at 25° C. (poises) | 3.5 | 3.3 | 4.1 | 1.9 | 2.2 | 1.7 | 2.8 | 3.5 |

(Note)
[1]Solvent used in each example in place of 90 parts of isopropyl alcohol used in Example 1, Step (A)
[2]Composition of a mixed solution used in each example in place of the mixed solution (I) used in Example 1, Step (A)
[3]trademark: Blemmer PE 350
[4]trademark: Blemmer QA (B) Production of a block copolymer A block copolymer was produced in the same manner as described in Example 1, except that a mixed solution having a composition shown in the following Table 8 was used in each example in place of the mixed solution (II) used in Example 1, Step (B).

TABLE 8

| | | Example | | | | | | | |
|---|---|---|---|---|---|---|---|---|---|
| | | 7 | 8 | 9 | 10 | 11 | 12 | 13 | 14 |
| Compositon of mixed solution (1) (parts) | Peroxy bond-containing polymer solution | 100 | 100 | 100 | 100 | 100 | 100 | 100 | 100 |
| | Styrene | — | 30 | — | 20 | — | — | 20 | — |
| | Methyl methacrylate | 20 | — | — | — | 20 | 20 | — | 20 |
| | 2-Hydroxy-3-methacryloxypropyl-trimethylammonium chloride | — | — | 20 | — | — | — | — | — |
| Property of the resulting dispersion containing a block copolymer | Content of block copolymer (%) | 42.7 | 64.5 | 54.8 | 56.3 | 56.7 | 56.6 | 42.3 | 54.7 |
| | Viscosity at 25° C. (poises) | 1.6 | 12 | 8.5 | 4.5 | 5.8 | 5.4 | 1.2 | 7.2 |

(Note)
(1) Composition of a mixed solution used in each example in place of the mixed solution (II) used in Example 1, Step (B).

(C) Modification of the surface of a polymer material

Test samples of Examples 7–12 and 14 were produced in the same manner as described in Example 1, Step (C), except that 100 parts of a polymer material shown in the following Table 9 was used in place of 100 parts of the polystyrene resin used in Example 1, Step (C), and a block copolymer produced in the above described Step (B) was used in an amount shown in Table 9 in place of 5 parts of the block copolymer used in Example 1, Step (C). A test sample of Example 13 was produced in the same manner as described in Example 2, Step (C), except that 100 parts of a polymer material shown in Table 9 was used in place of 100 parts of the polymethyl methacrylate resin used in Example 2, Step (C) and a block copolymer produced in the above described Step (B) was dissolved in ethyl Cellosolve, the amount of the block copolymer being shown in Table 9, in place of dissolving 5 parts of a block copolymer in ethyl acetate in Example 2, Step (C). The measuring method for the property of the surface of the test sample and the measuring environment are same as those described in Examples 1 and 2. The obtained results are shown in Table 9.

As seen from Table 9, when a polymer material is modified by using the block copolymer of the present invention, the modified polymer material has a surface resistivity, a surface resistivity after rubbing and a contact angle with pure water remarkably lower than those of a blank, and the block copolymer of the present invention is distinctly effective for modifying the surface of polymer material. Further, even when the surface of the modified polymer material was washed with city water at 25° C. for 1 hour at a flow rate of 2 l/min, the above described effect of the block copolymer was not at all deteriorated.

EXAMPLE 15

(A) Production of an azo bond-containing polymer

Into a reactor equipped with a thermometer, a stirrer and a reflux condenser was charged 90 parts of N,N-dimethylformamide, and while blowing nitrogen gas into the reactor and heating the reaction system at 70° C., a mixed solution (XI) consisting of

| | |
|---|---|
| N,N—dimethylformamide | 30 parts |
| polyethylene glycol monomethacrylate (trademark: Blemmer PE 90) and | 30 parts |
| $\left[\begin{array}{c}\overset{O}{\underset{\|}{C}}-CH_2CH_2-\underset{\underset{CN}{\|}}{\overset{CH_3}{\underset{\|}{C}}}-N=N-\underset{\underset{CN}{\|}}{\overset{CH_3}{\underset{\|}{C}}}-CH_2CH_2-\overset{O}{\underset{\|}{C}}O-\bigcirc-\underset{\underset{CH_3}{\|}}{\overset{CH_3}{\underset{\|}{C}}}-\bigcirc-O\right]_{4.0}$ | 8 parts | was charged into the reactor in 2 hours, and a polymerization reaction was further effected for 2 hours. The resulting solution was a transparent solution containing 23.8% of an azo bond-containing polymer and having a viscosity of 2.3 poises at 25° C.

TABLE 9

| | | Example | | | | | | | |
|---|---|---|---|---|---|---|---|---|---|
| | | 7 | 8 | 9 | 10 | 11 | 12 | 13 | 14 |
| Polymer material (parts) | Polystyrene resin (1) | — | 100 | — | 100 | — | — | 100 | — |
| | Polymethyl methacrylate resin (2) | 100 | — | 100 | — | — | 100 | — | — |
| | Polyvinyl chloride resin (3) | — | — | — | — | 100 | — | — | 100 |
| Block copolymer (parts) | | 5 | 5 | 10 | 10 | 5 | 3 | 3 | 3 |
| Property of the modified surface of polymer material | Surface resistivity ($\Omega$) | $6 \times 10^6$ | $5 \times 10^6$ | $5 \times 10^6$ | $3 \times 10^6$ | $5 \times 10^6$ | $7 \times 10^7$ | $8 \times 10^6$ | $3 \times 10^6$ |
| | Surface resistivity after rubbing ($\Omega$) | — | — | $5 \times 10^9$ | — | — | — | — | — |
| | Contact angle with pure water (°) | 56 | 60 | — | 58 | 42 | 55 | 65 | 55 |

(Note)
(1) The same polystyrene resin as used in Example 1, Step (C)
(2) The same polymethyl methacrylate resin as used in Example 2, Step (C)
(3) The same polyvinyl chloride resin as used in Example 3, Step (C)

(B) Production of a block copolymer

In a reactor equipped with a thermometer, a stirrer and a reflux condenser, a mixed solution (XII) consisting of 50 parts of the N,N-dimethylformamide solution of azo bond-containing polymer obtained in the above described Step (A), 80 parts of methyl alcohol and 70 parts of methyl methacrylate was heated at 70° C. for 10 hours while blowing nitrogen gas into the reactor, to effect a block copolymerization reaction and to obtain a milk-white dispersion containing 40.8% of a block copolymer and having a viscosity of 2.0 poises at 25° C. The resulting dispersion was poured into 2 l of water while stirring vigorously the resulting mixture, to precipitate the copolymer, and then the precipitate was filtered and dried to obtain the block copolymer.

(C) Modification of the surface of a polymer material

A mixture of 100 parts of polymethyl methacrylate resin and 5 parts of the block copolymer obtained in the above described Step (B) was kneaded in and extruded through an extruder into a sheet, and the sheet was further press molded into a sheet having a thickness of 0.5 mm. The sheet was free from both coloration and bleeding and had a good processability. As a blank, a sheet consisting only of polymethyl methacrylate resin was produced. The surface resistivity and the contact angle with pure water of the sample sheet and the blank were measured (measuring environment: relative humidity: 30%, temperature: 20° C.). The obtained results are shown in the following Table 10.

TABLE 10

|  | Surface resistivity ($\Omega$) | Contact angle (°) |
| --- | --- | --- |
| Addition of block copolymer | $3 \times 10^6$ | 40 |
| No addition of block copolymer | $5 \times 10^{15}$ | 80 |

It can be seen from Table 10 that the polymethyl methacrylate resin sheet containing the block copolymer of the present invention is remarkably lower in the surface resistivity and in the contact angle than the blank, and the block copolymer of the present invention is distinctly effective for modifying the surface of polymer material. Further, even when the surface of the modified resin sheet was washed with city water at 25° C. for 1 hour at a flow rate of 2 l/min, the above described effect of the block copolymer of the present invention was not at all deteriorated.

EXAMPLE 16

(A) Production of a peroxy bond-containing polymer

Into a reactor equipped with a thermometer, a stirrer and a reflux condenser was charged 90 parts of methyl Cellosolve, and while blowing nitrogen gas into the reactor and heating the reaction system at 70° C., a mixed solution (XIII) consisting of

| | |
| --- | --- |
| methyl cellosolve | 30 parts |
| polyethylene glycol monomethyl methacrylate (trademark: Blemmer PE 90) and | 30 parts |
| $+C(CH_2)_4CO(C_2H_4O)_3C(CH_2)_4COO+_{5.5}$ with four C=O groups | 6 parts | was charged into the reactor in 2 hours, and a polymerization reaction was further effected for 2 hours. The resulting solution was a transparent solution containing 22.5% of a peroxy bond-containing polymer and having a viscosity of 1.5 poises at 25° C.

(B) Production of a block copolymer

In a reactor equipped with a thermometer, a stirrer and a reflux condenser, a mixed solution (XIV) consisting of 100 parts of the methyl Cellosolve solution of peroxy bond-containing polymer obtained in the above described Step (A), 100 parts of water and 40 parts of butyl acrylate was heated at 70° C. for 6 hours while blowing nitrogen gas into the reactor, to effect a block copolymerization reaction and to obtain a milk-white dispersion containing 26.5% of a block copolymer and having a viscosity of 0.5 poise at 25° C.

(C) Modification of the surface of a polymer material

A mixture of 100 parts of an acrylic emulsion varnish (solid resin content: 50%) for thermoplastic emulsion paint and 3 parts of the dispersion of block copolymer obtained in the above described Step (B) was roll coated on a polymethyl methacrylate resin sheet, which was previously washed with ethanol, and then dried at 60° C. for 1 hour. As a blank, a varnish consisting only of the acrylic emulsion varnish for thermoplastic emulsion paint was roll coated on the same polymethyl methacrylate resin sheet as described above, and then dried at 60° C. for 1 hour. The surface resistivity and the contact angle with pure water of both the test sample and the blank were measured under the same measuring environment as described in Example 1. The obtained results are shown in the following Table 11.

TABLE 11

|  | Surface resistivity ($\Omega$) | Contact angle (°) |
| --- | --- | --- |
| Addition of block copolymer | $5 \times 10^6$ | 48 |
| No addition of block copolymer | $>5 \times 10^{16}$ | 85 |

It can be seen from Table 11 that the polymethyl methacrylate resin sheet having a coating film containing the block copolymer of the present invention is remarkably lower in the surface resistivity and in the contact angle than the blank, and the block copolymer is distinctly effective for modifying the surface of polymer material. Further, in the washing of the resin sheet surface, which had been coated with the film containing the block copolymer, with city water at 25° C. for 1 hour at a flow rate of 2 l/min, the above described effect of the block copolymer was not at all deteriorated.

It is clear from the results of the above described experiment that the use of the block copolymer of the present invention in a varnish is distinctly effective for modifying the surface of a polymer material by forming a coating film on the surface.

EXAMPLE 17

(A) Production of a peroxy bond-containing polymer

Into a reactor equipped with a thermometer, a stirrer and a reflux condenser was charged 90 parts of ethyl Cellosolve, and while blowing nitrogen gas into the reactor and heating the reaction system at 70° C., a mixed solution (XV) consisting of

| | |
|---|---|
| ethyl cellosolve | 30 parts |
| polyethylene glycol monomethacrylate (trademark: Blemmer PE 350) and | 30 parts |
| $+C(CH_2)_4CO(C_2H_4O)_3C(CH_2)_4COO+_{5.5}$ with four $\overset{O}{\underset{\|}{}}$ groups | 6 parts | was charged into the reactor in 2 hours, and a polymerization reaction further was effected for 2 hours. The resulting solution was a transparent solution containing 22.9% of a peroxy bond-containing polymer and having a viscosity of 2.0 poises at 25° C.

(B) Production of a block copolymer

In a reactor equipped with a thermometer, a stirrer and a reflux condenser, a mixed solution (XVI) consisting of 100 parts of the ethyl cellosolve solution of peroxy bond-containing polymer obtained in the above described Step (A), 50 parts of ethyl Cellosolve, 38 parts of methyl methacrylate and 2 parts of N-methylolacrylamide was heated at 75° C. for 6 hours while blowing nitrogen gas into the reactor, to effect a block copolymerization reaction and to obtain a semitransparent solution containing 32.8% of a block copolymer and having a viscosity of 3.5 poises at 25° C.

(C) Modification of the surface of a polymer material

The solution of block copolymer obtained in the above described Step (B) was diluted with water to produce a dispersion containing 10%, calculated as a solid, of the block copolymer in water-ethyl Cellosolve. A cotton cloth was immersed in the dispersion for 30 seconds, and then the cotton cloth was taken out from the dispersion, squeezed in a pick up of 80% between two rubber rollers, dried at 70° C. for 3 minutes, and then heat treated at 150° C. for 30 minutes. The surface resistivity of the cotton cloth treated with the dispersion containing the block copolymer and that of the dispersion-treated cotton cloth after washing were measured under the same measuring environment as described in Example 1. The obtained results are shown in the following Table 12.

TABLE 12

| | Surface resistivity ($\Omega$) | Surface resistivity after 50 times of washing (1) ($\Omega$) |
|---|---|---|
| Immersed in block copolymer dispersion | $8 \times 10^6$ | $8 \times 10^6$ |
| Not immersed in block copolymer dispersion | $5 \times 10^{14}$ | $>5 \times 10^{16}$ |

(1) Washing condition: 100 parts of a cotton cloth is washed in a mixture of 3.5 parts of a nonionic detergent and 3,500 parts of city water at 50° C. for 10 minutes by means of an electric washing machine, washed with water and dried.

It can be seen from Table 12 that the cotton cloth treated with the block copolymer of the present invention is not substantially changed in its surface resistivity even by as large as 50 times of washing, and the block copolymer of the present invention exhibits a remarkably excellent antistatic effect.

EXAMPLE 18

(A) Production of a peroxy bond-containing polymer

Into a reactor equipped with a thermometer, a stirrer and a reflux condenser was charged 60 parts of methyl alcohol, and while blowing nitrogen gas into the reactor and under a reflux of methyl alcohol, a mixed solution (XVII) consisting of

| | |
|---|---|
| methyl alcohol | 30 parts |
| deionized water | 30 parts |
| 2-hydroxy-3-methacryloxypropyl-trimethylammonium chloride (trademark: Blemmer QA) | 15 parts |
| polyethylene glycol monomethacrylate[1] and | 15 parts |
| $+C(CH_2)_4CO(C_2H_4O)_3C(CH_2)_4COO+_{5.5}$ | 6 parts |

[1]trademark: Blemmer PE 200, made by Nippon Oil and Fats Co., Ltd. (addition product of 4–5 moles of ethylene oxide to 1 mole of methacrylic acid)

was charged into the reactor in 1 hour, and a polymerization reaction was further effected for 2 hours. The resulting solution was a transparent solution containing 23.0% of a peroxy bond-containing polymer and having a viscosity of 2.5 poises at 25° C.

(B) Production of a block copolymer

In a reactor equipped with a thermometer, a stirrer and a reflux condenser, a mixed solution (XVIII) consisting of 100 parts of the water-methyl alcohol solution of peroxy bond-containing polymer obtained in the above described Step (A) and 20 parts of methyl methacrylate was heated for 8 hours under a reflux of methyl alcohol while blowing nitrogen gas into the reactor, to effect a block copolymerization reaction and to obtain a milk-white dispersion containing 42.5% of a block copolymer and having a viscosity of 0.5 poise at 25° C. The resulting dispersion was poured into 2 l of water while stirring vigorously the resulting mixture, to precipitate the copolymer, and then the precipitate was filtered and dried to obtain the block copolymer.

(C) Modification of the surface of a polymer material

A mixture of 100 parts of polyisoprene rubber and 5 parts of the block copolymer obtained in the above described Step (B) was kneaded in a mill and then formed into a sheet having a thickness of 1 mm. The sheet was free from both coloration and bleeding and had a good processability. As a blank, a sheet consisting only of polyisoprene rubber was produced. The surface resistivity of a sample sheet and a blank, and that of these sheets after rubbing were measured under the same measuring environment as described in Example 1. The obtained results are shown in the following Table 13.

TABLE 13

|  | Surface resistivity ($\Omega$) | Surface resistivity after rubbing ($\Omega$) |
| --- | --- | --- |
| Addition of block copolymer | $6 \times 10^6$ | $6 \times 10^6$ |
| No addition of block copolymer | $3 \times 10^{14}$ | $5 \times 10^{16}$ |

It can be seen from Table 13 that the polyisoprene rubber sheet containing the block copolymer of the present invention does not substantially change in its surface resistivity even in the rubbing of the surface, and the block copolymer exhibits remarkably excellent antistatic effect. Further, even when the surface of the modified rubber sheet was washed with city water at 25° C. for 1 hour at a flow rate of 2 l/min, the above described effect of the block copolymer was not at all deteriorated. Accordingly, it can be seen that the effect of the block copolymer of the present invention is also effective for polyisoprene series rubbers.

EXAMPLE 19

(A) Production of a peroxy bond-containig polymer

Into a reactor equipped with a thermometer, a stirrer and a reflux condenser were charged 30 parts of methyl Cellosolve and 30 parts of deionized water, and while blowing nitrogen gas into the reactor and heating the reaction system at 75° C., a mixed solution (XIX) consisting of

| methyl cellosolve | 30 parts |
| --- | --- |
| deionized water | 30 parts |
| sodium 2-methacrylamide-2-methylpropanesulfonate | 15 parts |
| 2-hydroxyethyl acrylate and | 15 parts |
| $+C(CH_2)_4CO(CH_2)_6OC(CH_2)_4COO+_{4.5}$ (with four C=O groups) | 8 parts | was charged into the reactor in 1 hour, and a polymerization reaction was further effected for 2 hours. The resulting solution was a semitransparent solution containing 22.8% of a peroxy bond-containing polymer and having a viscosity of 3.0 poises at 25° C.

(B) Production of a block copolymer

Into a reactor equipped with a thermometer, a stirrer and a reflux condenser was charged in 1 hour a mixed solution (XX) consisting of 100 parts of the water-methyl cellosolve solution of peroxy bond-containing polymer obtained in the above described Step (A), 10 parts of acrylamide and 10 parts of N,N-butoxymethylacrylamide, and then heated at 75° C. for 8 hours while blowing nitrogen gas into the reactor, to effect a block copolymerization reaction and to obtain a milk-white dispersion containing 42.3% of a block copolymer and having a viscosity of 1 poise at 25° C. The resulting dispersion was poured into 2 l of diethyl ether while stirring vigorously the resulting mixture, to precipitate the copolymer, and the precipitate was filtered and dried to obtain the block copolymer.

(C) Modification of the surface of a polymer material

A mixture of 100 parts of polyamide and 3 parts of the block copolymer obtained in the above described Step (B) was kneaded in and extruded through an extruder into a monofilament. The monofilament was uniformly wound around a polymethyl methacrylate resin sheet in two layers to produce a test sample. A blank test sample was produced in the same manner as described above, except that polyamide alone was kneaded in and extruded through an extruder into a monofilament. The surface resistivities of the test sample and the blank test sample, and those of these samples after rubbing were measured under the same measuring environment as described in Example 1. The obtained results are shown in the following Table 14.

TABLE 14

|  | Surface resistivity ($\Omega$) | Surface resistivity after rubbing ($\Omega$) |
| --- | --- | --- |
| Addition of block copolymer | $3 \times 10^6$ | $3 \times 10^6$ |
| No addition of block copolymer | $5 \times 10^{15}$ | $8 \times 10^{16}$ |

It can be seen from Table 14 that the polyamide filament containing the block copolymer of the present invention does not substantially change in its surface resistivity even when the surface of the filament is rubbed, and the use of the block copolymer exhibits distinctly excellent antistatic effect. Further, even when the surface of the above modified filaments, before and after the rubbing, was washed with city water at 25° C. for 1 hour at a flow rate of 2 l/min, the above described effect of the block copolymer was not at all deteriorated. Accordingly, it was found out that the block copolymer of the present invention was effective for nylon series fibers as well.

EXAMPLE 20

(A) Production of a peroxy bond-containing polymer

Into a reactor equipped with a thermometer, a stirrer and a reflux condenser was charged 60 parts of ethyl Cellosolve, and while blowing nitrogen gas into the reactor and heating the reaction system at 75° C., a mixed solution (XXI) consisting of

| ethyl cellosolve | 60 parts |
| --- | --- |
| polyethylene glycol monomethacrylate (trademark: Blemmer PE 350) and | 30 parts |
| $+C(CH_2)_4CO(C_2H_4O)_3C(CH_2)_4COO+_{5.5}$ (with four C=O groups) | 10 parts | was charged into the reactor in 2 hours, and a polymerization reaction was further effected for 2 hours. The resulting solution was transparent solution containing 23.0% of a peroxy bond-containing polymer and having a viscosity of 2.5 poises at 25° C.

(B) Production of a block copolymer

Into a reactor equipped with a thermometer, a stirrer and a reflux condenser was charged in 1 hour a mixed solution (XXII) consisting of 100 parts of the ethyl Cellosolve solution containing peroxy bond-containing polymer obtained in the above described Step (A), 10 parts of N-vinyl pyrrolidone and 10 parts of vinyl acetate, and the mixed solution (XXII) was further heated at 80° C. for 7 hours while blowing nitrogen gas into the reactor, to effect a block copolymerization reaction and to obtain a milk-white dispersion containing 42.5% of a block copolymer and having a viscosity of 0.8 poise at 25° C. The resulting dispersion was poured into 2 l of diethyl ether while stirring vigorously the resulting mixture, to precipitate the copolymer, and the precipitate was filtered and dried to obtain the block copolymer.

(C) Modification of the surface of a polymer material

A mixture of 100 parts of polyester resin powder and 3 parts of the block copolymer obtained in the above described Step (B) was kneaded in and extruded through an extruder into a sheet, and the sheet was further press molded into a sheet having a thickness of 0.5 mm. The sheet was free from both coloration and bleeding and had a good processability. As a blank, a sheet consisting only of polyester resin was produced. The surface resistivity and the contact angle with pure water of these two sheets were measured under the same measuring environment as described in Example 1. The obtained results are shown in the following Table 15.

TABLE 15

|  | Surface resistivity ($\Omega$) | Contact angle (°) |
|---|---|---|
| Addition of block copolymer | $6 \times 10^7$ | 48 |
| No addition of block copolymer | $3 \times 10^{15}$ | 80 |

It can be seen from Table 15 that the polyester resin sheet containing the block copolymer of the present invention is remarkably lower in the surface resistivity and in the contact angle than the blank, and the use of the block copolymer is distinctly effective for modifying the surface of a polymer material. Further, even when the surface of the above modified resin sheet was washed with city water at 25° C. for 1 hour at a flow rate of 2 l/min, the above described effect of the block copolymer was not at all deteriorated.

EXAMPLE 21

(A) Production of an azo bond-containing polymer

Into a reactor equipped with a thermometer, a stirrer and a reflux condenser was charged 60 parts of N,N-dimethylformamide, and while blowing nitrogen gas into the reactor and heating the reaction system at 75° C., a mixed solution (XXIII) consisting of

| N,N—dimethylformamide | 60 parts |
|---|---|
| N,N—hydroxy-3-methacryloxypropyl-trimethylammonium chloride (trademark: Blemmer QA) and | 30 parts |
| $+C-C-N=N-C-CO(CH_2CH_2O)_3+_{5.0}$ (with $CH_3$, $CH_3$, $O$, $CH_3$, $O$, $CH_3$ groups) | 6 parts | was charged into the reactor in 2 hours, and a polymerization reaction was further effected for 3 hours. The resulting solution was a transparent solution containing 23.3% of an azo bond-containing polymer and having a viscosity of 1.8 poises at 25° C.

(B) Production of a block copolymer

In a reactor equipped with a thermometer, a stirrer and a reflux condenser, a mixed solution (XXIV) consisting of 50 parts of the N,N-dimethylformamide solution of azo bond-containing polymer obtained in the above described Step (A), 80 parts of N,N-dimethylformamide and 70 parts of methyl methacrylate was heated at 75° C. for 13 hours while blowing nitrogen gas into the reactor, to effect a block copolymerization reaction and to obtain an yellow transparent solution containing 40.5% of a block copolymer and having a viscosity of 3.5 poises at 25° C.

(C) Modification of the surface of a polymer material

The solution of block copolymer obtained in the above described Step (B) was applied on an acrylic resin sheet by a bar coating so that a block copolymer film having a thickness of 10 μm would be formed after drying, and the applied solution was dried at room temperature for 2 hours and further at 60° C. for 2 hours. As a blank, an acrylic resin sheet as such was used. The surface resistivity and the contact angle with pure water of both the sample sheet and the blank were measured under the same measuring environment described in Example 1. The obtained results are shown in the following Table 16.

TABLE 16

|  | Surface resistivity ($\Omega$) | Contact angle (°) |
|---|---|---|
| Applied with block copolymer | $5 \times 10^6$ | 43 |
| Not applied with block copolymer | $>5 \times 10^{16}$ | 80 |

It can be seen from Table 16 that the acrylic resin sheet applied with a film of the block copolymer of the present inventon is remarkably lower than the blank in the surface resistivity and in the contact angle with pure water, and the block copolymer of the present invention is distinctly effective for modifying the surface of polymer material. Further, even when the acrylic resin sheet surface coated with a film of the block copolymer of the present invention was washed with city water at 25° C. for 1 hour at a flow rate of 2 l/min, the above described effect of the block copolymer of the present invention was not at all deteriorated.

EXAMPLE 22

(A) Production of an azo bond-containing polymer

Into a reactor equipped with a thermometer, a stirrer and a reflux condenser were charged 30 parts of N,N-dimethylformamide and 30 parts of deionized water, and while blowing nitrogen gas into the reactor and heating the reaction system at 80° C., a mixed solution (XXV) consisting of

| N,N—dimethylformamide | 30 parts |
|---|---|
| deionized water | 30 parts |
| 2-methacrylamide-2-methylpropanesulfonic acid and | 30 parts |

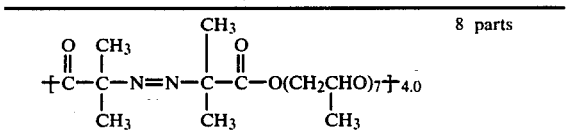

8 parts was charged into the reactor in 1 hour and a polymerization reaction was further effected for 2 hours. The resulting solution was a transparent solution containing 23.0% of an azo bond-containing polymer and having a viscosity of 1.5 poises at 25° C.

(B) Production of a block copolymer

Into a reactor equipped with a thermometer, a stirrer and a reflux condenser was charged in 1 hour a mixed solution (XXVI) consisting of 100 parts of the N,N-dimethylformamide-water solution of azo bond-containing polymer obtained in the above described Step (A), 10 parts of N-vinylpyrrolidone and 10 parts of vinyl acetate, and then the mixed solution (XXVI) was heated at 80° C. for 6 hours while blowing nitrogen gas into the reactor, to effect a block copolymerization reaction and to obtain a milk-white dispersion containing 42.5% of a block copolymer and having a viscosity of 1 poise at 25° C. The resulting dispersion was poured into 2 l of diethyl ether while stirring vigorously the resulting mixture, to precipitate the copolymer, and the precipitate was filtered and dried to obtain the block copolymer.

(C) Modification of the surface of a polymer material

A mixture of 100 parts of polyester resin and 5 parts of the block copolymer obtained in the above described Step (B) was kneaded in and extruded through an extruder into a monofilament. The monofilament was uniformly wound around a polymethyl methacrylate resin sheet in two layers to produce a test sample. A blank test sample was produced in the same manner as described above, except that polyester alone was kneaded in and extruded through an extruder into a monofilament. The surface resistivity of the test sample and the blank test sample, and that of these test samples after rubbing were measured under the same measuring environment as described in Example 1. The obtained results are shown in the following Table 17.

TABLE 17

|  | Surface resistivity (Ω) | Surface resistivity after rubbing (Ω) |
|---|---|---|
| Addition of block copolymer | $5 \times 10^6$ | $5 \times 10^6$ |
| No addition of block copolymer | $3 \times 10^{15}$ | $5 \times 10^{16}$ |

It can be seen from Table 17 that the polyester filament containing the block copolymer of the present invention does not substantially change in its surface resistivity even when the surface of the filament is rubbed, and the use of the block copolymer exhibits a remarkably excellent antistatic effect. Further, even when the surface of the above modified filaments, before and after the rubbing, was washed with city water at 25° C. for 1 hour at a flow rate of 2 l/min, the above described antistatic effect of the block copolymer was not at all deteriorated.

EXAMPLE 23

(A) Production of an azo bond-containing polymer

Into a reactor equipped with a thermometer, a stirrer and a reflux condenser was charged 90 parts of N,N-dimethylformamide, and while blowing nitrogen gas into the reactor and heating the reaction system at 70° C., a mixed solution (XXVII) consisting of

| N,N—dimethylformamide | 30 parts |
|---|---|
| polyethylene glycol monomethacrylate (trademark: Blemmer PE 200) and | 30 parts |

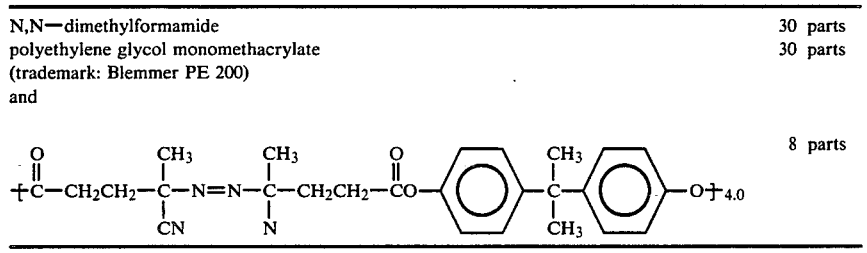

8 parts was charged into the reactor in 2 hours, and a polymerization reaction was further effected at 70° C. for 2 hours. The resulting solution was a transparent solution containing 23.8% of an azo bond-containing polymer and having a viscosity of 2.8 poises at 25° C.

(B) Production of a block copolymer

Into an autoclave equipped with a thermometer and a stirrer was charged a mixed solution (XXVIII), which consisted of 50 parts of the N,N-dimethylformamide solution of azo bond-containing polymer obtained in the above described Step (A), 80 parts of methyl alcohol and 70 parts of vinyl chloride and was previously been cooled to −30° C. by a dry ice-methyl alcohol system, and then the mixed solution (XXVIII) was heated at 70° C. for 10 hours under pressure while blowing nitrogen gas into the autoclave, to effect a block copolymerization reaction and to obtain a milk-white dispersion containing 40.5% of a block copolymer and having a viscosity of 2.5 poises at 25° C. The resulting dispersion was poured into 2 l of water while stirring vigorously the resulting mixture, to precipitate the copolymer, and the precipitate was filtered and dried to obtain the block copolymer.

(C) Modification of the surface of a polymer material

A mixture of 100 parts of acrylonitrile-butadiene rubber and 5 parts of the block copolymer obtained in the above described Step (B) was kneaded in a mill, and then formed into a sheet having a thickness of 1 ml. The sheet was free from both coloration and bleeding and had a good processability. As a blank, a sheet consisting only of acrylonitrile-butadiene rubber was produced. The surface resistivity of both the modified sheet and the blank and that of both sheets after rubbing were measured under the same measuring environment as described in Example 1. The obtained results are shown in the following Table 18.

TABLE 18

|  | Surface resistivity ($\Omega$) | Surface resistivity after rubbing ($\Omega$) |
| --- | --- | --- |
| Addition of block copolymer | $8 \times 10^6$ | $8 \times 10^6$ |
| No addition of block copolymer | $5 \times 10^{14}$ | $8 \times 10^{16}$ |

It can be seen from Table 18 that the acrylonitrilebutadiene rubber sheet mixed with the block copolymer of the present invention does not substantially change in its surface resistivity even when the rubber surface is rubbed, and the use of the block copolymer of the present invention exhibits a remarkably excellent antistatic effect. Further, even when the surface of the modified rubbers before and after rubbing, was washed with city water at 25° C. for 1 hour at a flow rate of 2 l/min, the above described effect of the block copolymer was not at all deteriorated.

COMPARATIVE EXAMPLE 1

A mixture of 100 parts of the same polystyrene resin as used in Example 1 and 1 part of calcium salt of imidazoline type amphoteric surfactant was kneaded in and extruded through an extruder into a sheet, and the sheet was further press molded into a sheet having a thickness of 0.5 mm. In the resulting sheet, the coloration was little, but bleeding was observed on the sheet surface. The sheet had a surface resistivity of $2 \times 10^{13} \Omega$ and a contact angle of 79°. (Measuring environment is the same as described in Example 1.)

When the surface of the resin sheet was washed with city water at 25° C. for 1 hour at a flow rate of 2 l/min, the surface resistivity was increased to $3 \times 10^{15} \Omega$ and the contact angle was increased to 98°.

COMPARATIVE EXAMPLE 2

In ethyl acetate were dissolved 100 parts of the same polymethyl methacrylate resin as used in Example 2 and 1 part of lauryltrimethylammonium chloride, and a film was produced by solvent casting. In the film, there was a little coloration, and bleeding was observed on the film surface. The film had a surface resistivity of $6 \times 10^{12} \Omega$ and a contact angle of 70°. (Measuring environment is the same as described in Example 1.) When the film surface was washed with city water 25° C. for 1 hour at flow rate of 2 l/min, the surface resistivity was increased to $5 \times 10^{15} \Omega$ and the contact angle was increased to 85°.

What is claimed is:

1. A method for modifying the surface of a natural polymer material, comprising adding a block copolymer consisting of a polymer portion compatible with the natural polymer material and a hydrophilic polymer portion to the natural polymer material,
    said block copolymer having been produced through the following first and second steps,
    in the first step, either a vinyl monomer which forms a hydrophilic polymer, or a vinyl monomer which forms a polymer compatible with the polymer material, is polymerized in the presence of a polymeric peroxide as a polymerization initiator to produce a peroxy bond containing polymer, and
    in the second step, either a vinyl monomer which forms a hydrophilic polymer, or a vinyl monomer which forms a polymer compatible with the natural polymer material, both the vinyl monomers being used in such a manner that, when a hydrophilic polymer is produced in the first step, a vinyl monomer which forms a polymer compatible with the natural polymer material is used in the second step, and when a polymer compatible with the natural polymer material is produced in the first step, a vinyl monomer which forms a hydrophilic polymer is used in the second step, is polymerized in the presence of a polymerization initiator of the peroxy bond- or azo bond-containing natural polymer obtained in the first step.

2. A method according to claim 1, wherein said natural polymer material is resin, fiber or rubber.

3. A method according to claim 1, wherein said natural polymer material is resin, natural rubber, cotton, linen, wool or silk.

* * * * *